(12) United States Patent
Kim et al.

(10) Patent No.: US 8,098,358 B2
(45) Date of Patent: Jan. 17, 2012

(54) LIQUID CRYSTAL DISPLAY

(75) Inventors: Hoon Kim, Ansan-si (KR); Seung-Soo Baek, Seoul (KR); Hye-Seok Na, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 12/472,983

(22) Filed: May 27, 2009

(65) Prior Publication Data

US 2010/0134742 A1 Jun. 3, 2010

(30) Foreign Application Priority Data

Nov. 28, 2008 (KR) ........................ 10-2008-0120014

(51) Int. Cl.
*G02F 1/1343* (2006.01)

(52) U.S. Cl. ............ 349/141; 349/56; 349/84; 349/139; 349/140

(58) Field of Classification Search .................... 349/56, 349/84, 139, 140, 141
See application file for complete search history.

(56) References Cited

U.S. PATENT DOCUMENTS

| | | | |
|---|---|---|---|
| 7,440,040 B2 * | 10/2008 | Kwak et al. ..................... 349/39 |
| 2007/0242009 A1 | 10/2007 | Su | |
| 2008/0088783 A1 | 4/2008 | Tai | |

FOREIGN PATENT DOCUMENTS

| | | |
|---|---|---|
| JP | 2003066453 | 3/2003 |
| JP | 2007212914 | 8/2007 |
| JP | 2007249243 | 9/2007 |
| JP | 2008116916 | 5/2008 |
| KR | 1020070049882 | 5/2007 |
| KR | 1020070082752 | 8/2007 |
| KR | 1020070101549 | 10/2007 |
| KR | 1020080049366 | 6/2008 |

\* cited by examiner

*Primary Examiner* — Jennifer Doan

(74) *Attorney, Agent, or Firm* — H.C. Park & Associates, PLC

(57) ABSTRACT

The present invention relates to a liquid crystal display that includes: gate lines and data lines arranged on a first substrate; pixel electrodes connected to the gate lines and the data lines, and including a first sub-pixel electrode and a second sub-pixel electrode separated from each other by a gap; a common electrode arranged on a second substrate, and facing the pixel electrodes; and a liquid crystal layer disposed between the pixel electrodes and the common electrode and including a plurality of liquid crystal molecules, wherein each of the first sub-pixel electrode and the second sub-pixel electrode includes a plurality of fine branch portions, the second sub-pixel electrodes include a connection portion surrounding the fine branch portions of the first sub-pixel electrodes, and a plurality of notches are formed in the connection portion of the second sub-pixel electrode.

15 Claims, 7 Drawing Sheets

LIQUID CRYSTAL DISPLAY

CROSS REFERENCE TO RELATED APPLICATION

This application claims priority from and the benefit of Korean Patent Application No. 10-2008-0120014, filed on Nov. 28, 2008, which is hereby incorporated by reference for all purposes as if fully set forth herein.

BACKGROUND OF THE INVENTION

1. Field of the Invention

The present invention relates to a liquid crystal display.

2. Discussion of the Background

A liquid crystal display (LCD) is one of the most widely used types of flat panel displays. An LCD includes two display panels having field-generating electrodes, such as pixel electrodes and a common electrode, and a liquid crystal layer interposed between the display panels. The LCD induces an electric field in the liquid crystal layer by applying voltages to the field generating electrodes. The electric field determines the orientation of liquid crystal molecules in the liquid crystal layer, and this orientation controls the polarization of incident light so as to form an image.

Among the LCDs, a vertical alignment (VA) mode LCD is used in which the longitudinal axes of the liquid crystal molecules are arranged to be perpendicular to the display panels in a state where the electric field is not applied.

Forming cutouts such as fine slits in the field generating electrodes or forming protrusions on the field generating electrodes may be used to achieve a wide viewing angle in the VA mode LCD. Since the cutouts and the protrusions determine a tilt direction of the liquid crystal molecules, the tilt direction of the liquid crystal molecules may be decentralized by appropriately disposing the cutouts and the protrusions on the field generating electrodes, thereby widening the reference viewing angle.

Furthermore, a VA mode LCD may have poor lateral visibility compared to front visibility. In order to solve this problem, a method of dividing one pixel into two sub-pixels and applying different voltages to the two sub-pixels has been proposed. In an LCD with two sub-pixels, sub-pixels to which a high voltage is applied and gate lines should be spaced apart from each other a certain distance. Spacing the pixel electrodes and gate lines apart may reduce a kickback voltage of the LCD.

However, when pixel electrodes and gate lines are spaced apart, liquid crystal molecules located near the gate lines may not be affected by a tilt direction determining member formed on the pixel electrodes, thus producing an irregular texture. This irregular texture may deteriorate the display quality of the LCD.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention relates to a liquid crystal display (LCD) that reduces a kickback voltage of a display device and does not produce an irregular texture.

Additional features of the invention will be set forth in the description which follows, and in part will be apparent from the description, or may be learned by practice of the invention.

The present invention discloses a liquid crystal display that includes: gate lines and data lines arranged on a first substrate; pixel electrodes connected to the gate lines and the data lines, and including a first sub-pixel electrode and a second sub-pixel electrode separated from each other by a gap; a common electrode arranged on a second substrate, and facing the pixel electrodes; and a liquid crystal layer disposed between the pixel electrodes and the common electrode, and including a plurality of liquid crystal molecules, wherein each of the first sub-pixel electrode and the second sub-pixel electrode includes a plurality of fine branch portions, the second sub-pixel electrode includes a connection portion surrounding the fine branch portions of the first sub-pixel electrode, and a plurality of notches are formed in the connection portion of the second sub-pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
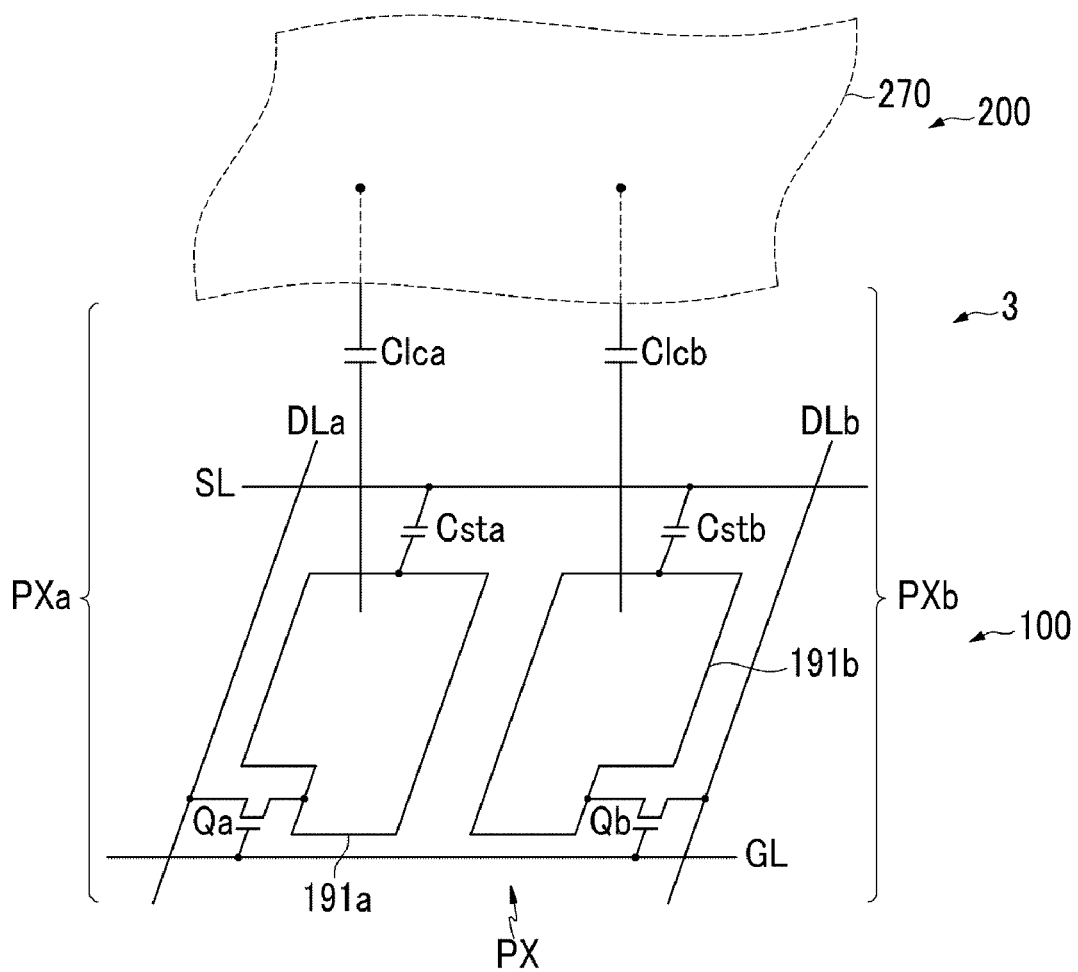
FIG. 1 is an equivalent circuit diagram of one pixel of a liquid crystal display according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is an equivalent circuit diagram of one pixel of a LCD according to an exemplary embodiment of the present invention.

Referring to FIG. 1, a liquid crystal display according to the present exemplary embodiment includes signal lines including a plurality of gate lines GL, a plurality of data lines DLa and DLb, and a plurality of pixels PX connected to the signal lines GL, DLa, and DLb. From a structural point of view, the liquid crystal display includes a lower display panel 100 and an upper display panel 200 that face each other, and a liquid crystal layer 3 interposed between the lower display panel 100 and the upper display panel 200.

Each pixel PX includes a pair of sub-pixels PXa and PXb. The sub-pixels PXa and PXB respectively include switching elements Qa and Qb, liquid crystal capacitors Clca and Clcb, and storage capacitors Csta and Cstb.

Each switching element Qa/Qb, which includes a thin film transistor (TFT), is a three-terminal element provided on the lower display panel 100. The control terminals of the first and second switching elements Qa and Qb are connected to the gate lines GL, the input terminals thereof are connected to the data lines DLa and DLb, and the output terminals thereof are connected to the liquid crystal capacitors Clca and Clcb and the storage capacitors Csta and Cstb.

The liquid crystal capacitors Clca and Clcb use sub-pixel electrodes 191*a* and 191*b* and a common electrode 270 as two terminals, while the liquid crystal layer 3 interposed between the two terminals is used as a dielectric material.

The storage capacitors Csta and Cstb, which assist the liquid crystal capacitors Clca and Clcb, have storage electrode lines SL and sub-pixel electrodes 191*a* and 191*b* provided on the lower display panel 100 and overlap with each other. An insulator is interposed between the storage capacitors Csta and Cstb. A fixed voltage, such as a common voltage Vcom, is applied to the storage electrode lines SL.

Voltages charged in the two liquid crystal capacitors Clca and Clcb are set to be slightly different from each other. For example, a data voltage applied to the liquid crystal capacitor Clca is set to be lower or higher than a data voltage applied to the liquid crystal capacitor Clcb. Accordingly, the voltages of the two liquid crystal capacitors Clca and Clcb can be adjusted so that an image viewed from a lateral side of the pixel approaches the image viewed from the front, thereby improving the lateral visibility of the LCD.

An LCD according to an exemplary embodiment of the present invention will be described in detail below with reference to FIG. 2 and FIG. 3.

Figure 2:
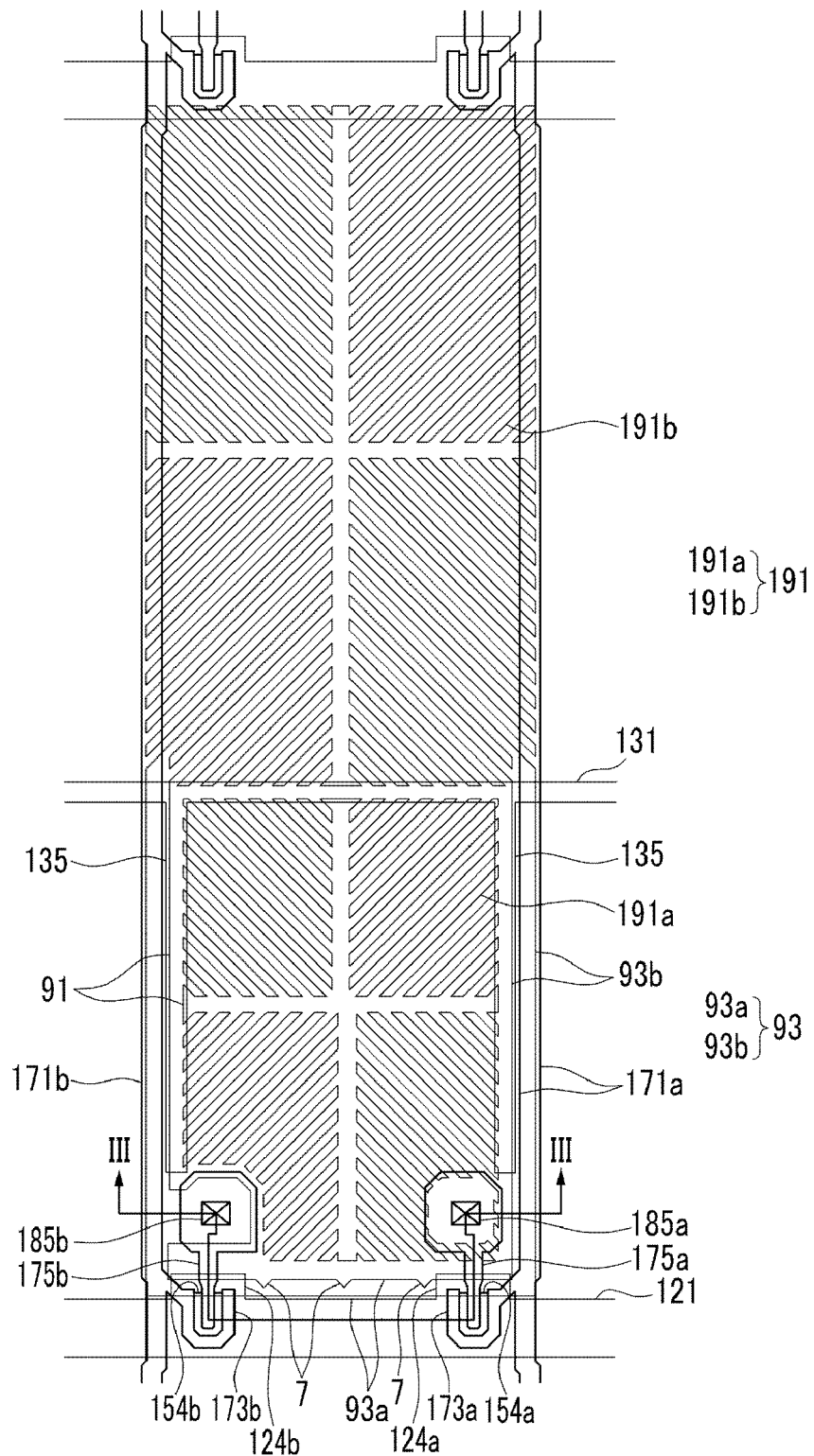
FIG. 2 is a layout view of a liquid crystal display according to an exemplary embodiment of the present invention.
Figure 3:
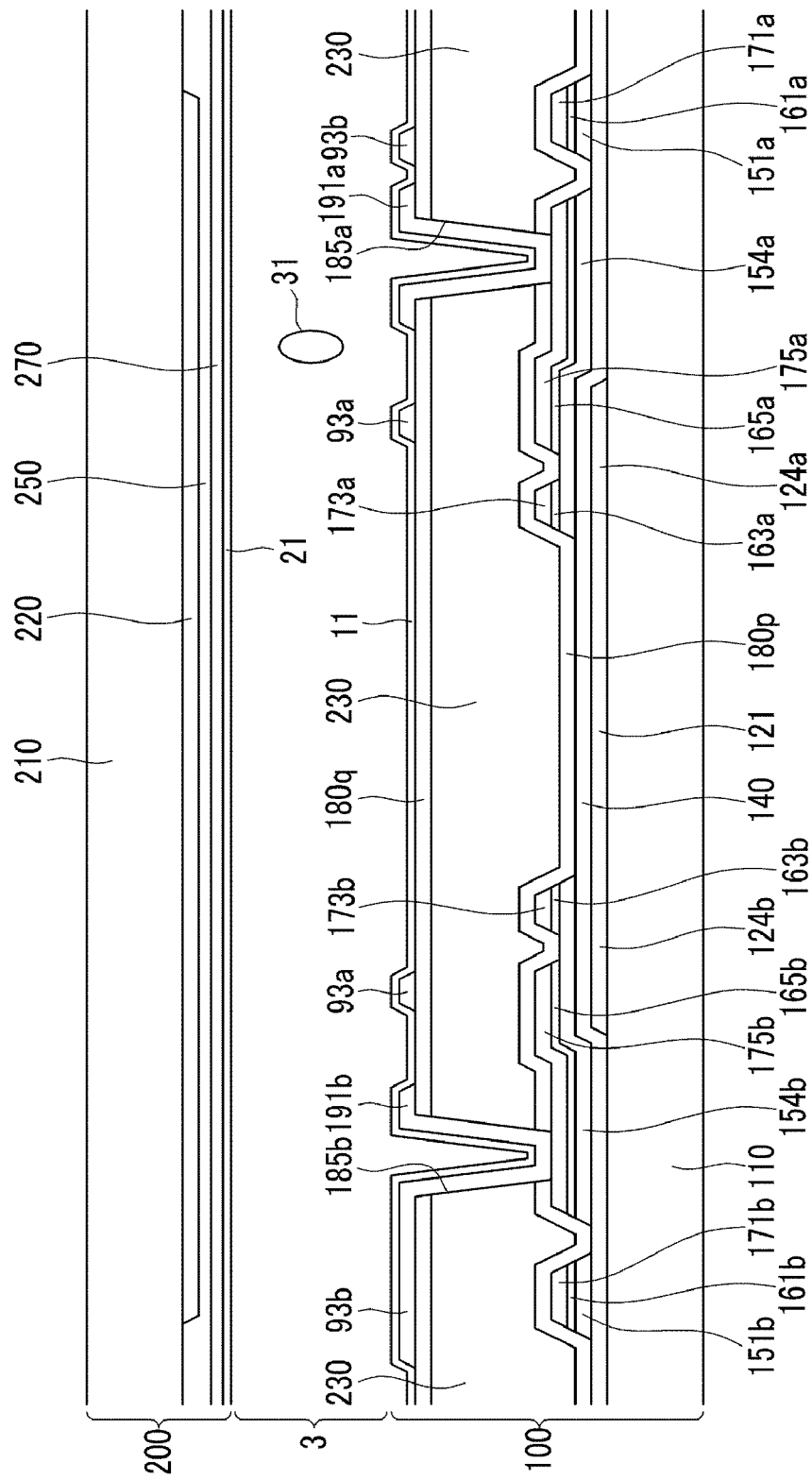
FIG. 3 is a cross-sectional view taken along line III-III of the liquid crystal display shown in FIG. 2.

FIG. 2 is a layout view of an LCD according to an exemplary embodiment of the present invention, and FIG. 3 is a cross-sectional view taken along line III-III of the LCD shown in FIG. 2.

An LCD of the present exemplary embodiment includes a TFT display panel 100 and a common electrode display panel 200 facing each other, and a liquid crystal layer 3 interposed between the TFT display panel 100 and the common electrode display panel 200.

First, the TFT display panel 100 will be described below.

Referring to FIG. 2 and FIG. 3, a plurality of gate lines 121 and a plurality of storage electrode lines 131 are formed on an insulating substrate 110.

The gate lines 121 transmit gate signals and extend in a substantially horizontal direction. Each of the gate lines 121 includes a plurality of gate electrodes 124*a* and 124*b* protruding upward.

Each of the storage electrode lines 131 includes a stem line extending in a direction substantially parallel with the gate line 121 and a plurality of storage electrodes 135 branched from the stem line.

The shape and arrangement of the storage electrode lines 131 may be modified in various ways.

A gate insulating layer 140 is formed on the gate lines 121 and the storage electrode lines 131. A plurality of first and second semiconductor stripes 151*a* and 151*b* made of amorphous silicon or crystalline silicon are formed on the gate insulating layer 140. Each of the semiconductor stripes 151*a* and 151*b* includes a plurality of projections 154*a* and 154*b* protruding toward the gate electrodes 124.

A plurality of pairs of ohmic contact members 161*a*, 161*b*, 163*a*, 163*b*, 165*a*, and 165*b* are formed on the semiconductor stripes 151*a* and 151*b*. The ohmic contacts 161*a*, 161*b*, 163*a*, 163*b*, 165*a*, and 165*b* may be made of n+ hydrogenated amorphous silicon in which silicide or an n-type impurity is doped with a high concentration.

A plurality of data lines 171*a* and 171*b* and a plurality of first and second drain electrodes 175*a* and 175*b* are formed on the ohmic contact members 161*a*, 161*b*, 163*a*, 163*b*, 165*a*, and 165*b* and the gate insulating layer 140.

The data lines 171 transmit data signals, and extend in a substantially vertical direction so as to cross the gate lines 121 and the stem lines of the storage electrode lines 131. The data lines 171*a* and 171*b* include first and second source electrodes 173*a* and 173*b*. The first and second source electrodes 173*a* and 173*b* are bent in a U-shape by extending toward the first and second gate electrode 124*a* and 124*b*, and the first and second source electrodes 175*a* and 175*b* face the first and second source electrodes 173*a* and 173*b* with respect to the first and second gate electrode 124*a* and 124*b*.

The drain electrodes 175*a* and 175*b* each include one end portion extending upward, which is partially surrounded by the first and second source electrodes 173*a* and 173*b*, respectively, and another end portion having a wide area so as to be connected to another layer.

However, the shape and arrangement of the data lines 171*a* and 171*b* including the first and second drain electrodes 175*a* and 175*b* may be modified in various ways.

The first and second gate electrodes 124*a* and 124*b*, the first and second source electrodes 173*a* and 173*b*, and the first and second drain electrodes 175*a* and 175*b*, along with the projections 154*a* and 154*b* of the first and second semiconductor stripes 151*a* and 151*b*, form first and second TFTs Qa and Qb. Each of the first and second TFTs Qa and Qb has a channel formed in the projections 154*a* and 154*b* of the semiconductor stripes 151*a* and 151*b* disposed between the first and second source electrodes 173*a* and 173*b* and the first and second drain electrodes 175*a* and 175*b*, respectively.

The ohmic contacts 161*a*, 161*b*, 163*a*, 163*b*, 165*a*, and 165*b* are interposed between the projections 154*a* and 154*b* of the underlying semiconductor stripes 151*a* and 151*b* and the overlying data lines 171*a* and 171*b*, the source electrodes 173*a* and 173*b*, and drain electrodes 175*a* and 175*b*. The ohmic contacts 161*a*, 161*b*, 163*a*, 163*b*, 165*a*, and 165*b* may reduce the contact resistance between the projections 154*a* and 154*b* of the underlying semiconductor stripes 151*a* and 151*b* and the overlying data lines 171*a* and 171*b*, the source electrodes 173*a* and 173*b*, and drain electrodes 175*a* and 175*b*. The semiconductor stripes 151*a* and 151*b* include some exposed portions that are not covered with the data lines 171*a* and 171*b* and the drain electrodes 175*a* and 175*b*, such as portions located between the source electrodes 173*a* and 173*b* and the drain electrodes 175*a* and 175*b*.

The ohmic contact members 161*a*, 161*b*, 163*a*, 163*b*, 165*a*, and 165*b*, the data lines 171*a*, 171*b*, 173*a*, and 173*b*, and the drain electrodes 175*a* and 175*b* have the same planar pattern, and have substantially the same planar pattern as the semiconductor stripes 151*a* and 151*b* except for exposed portions between the drain electrodes 175*a* and 175*b* and the source electrodes 173*a* and 173*b*.

A lower passivation film 180p made of silicon nitride or silicon oxide is formed on the data lines 171a and 171b, the drain electrodes 175a and 175b, and the exposed semiconductor stripes 151a and 151b.

A color filter 230 is formed on the lower passivation film 180p. The lower passivation film 180p may prevent a pigment of the color filter 230 from flowing to the exposed portions of the semiconductor stripes 154a and 154b. The color filter 230 may alternately be formed on the common electrode display panel 200.

An upper passivation film 180q is formed on the color filter 230. The upper passivation layer 180q may be made of an inorganic material. The upper passivation layer 180q prevents the color filter 230 from separating from the layers on which it is formed and suppresses contamination of the liquid crystal layer 3 caused by an organic material, such as a solvent, flowing from the color filter 230. Forming the upper passivation layer 180q on the color filter 230 may help prevent defects such as an afterimage that may be caused when the LCD is driven.

A plurality of pixel electrodes 191 are formed on the upper passivation film 180q.

Each of the pixel electrodes 191 includes first and second sub-pixel electrodes 191a and 191b separated from each other by a gap 91.

The first and second sub-pixel electrodes 191a and 191b have an overall shape of a quadrangle, and include cross-shaped stem portions including horizontal stem portions and vertical stem portions extending from the horizontal stem portions, so the horizontal and vertical stem portions are substantially perpendicular to each other. The first and second sub-pixel electrodes 191a and 191b are divided into four sub-regions by the horizontal stem portions and the vertical stem portions, and each of the sub-regions includes a plurality of fine branch portions.

The second sub-pixel electrode 191b surrounds the first sub-pixel electrode 191a. The second sub-pixel electrode 191b is connected from the fine branch portions to surround three sides of the first sub-pixel electrode 191a, and includes a connection portion 93 having a quadrangular semicircular shape. The connection portion 93 includes a first portion 93a formed in parallel with the gate lines 121, and two second portions 93b formed in parallel with the data lines 171a and 171b. The first portion 93a and the two second portions 93b are interconnected and surround three sides of the first sub-pixel electrode 191a.

One of the fine branch portions of each the first sub-pixel electrode 191a and the second sub-pixel electrode 191b obliquely extends in a left-upward direction from the horizontal stem portions or the vertical stem portions, and another fine branch portion of each sub-pixel electrode 191a and 191b obliquely extends in a right-upward direction from the horizontal stem portions or the vertical stem portions. Another fine branch portion of each sub-pixel electrode 191a and 191b extends in a left-downward direction from the horizontal stem portions or the vertical stem portions, and the remaining branch portion of each sub-pixel electrode 191a and 191b obliquely extends in a right-downward direction from the horizontal stem portions or the vertical stem portions.

Each of the fine branch portions makes an angle of about 45 or 135 degrees to the gate lines 121 or the horizontal stem portions. The branch portions in two adjacent sub-regions may extend substantially perpendicular to each other.

Although not shown, the fine branch portions may be wider when they are closer to the horizontal stem portions or the vertical stem portions.

The area occupied by the second sub-pixel electrode 191b in the entire pixel electrode 191 may be larger than the area occupied by the first sub-pixel electrode 191a, and the area of the second sub-pixel electrode 191b may be 1.0 to 2.5 times larger than the area of the first sub-pixel electrode 191a. However, the shape or area ratio of the first and second sub-pixel electrodes 191a and 191b may be modified in various ways.

Referring to FIG. 2, the first sub-pixel electrode 191a of the pixel electrode 191 is spaced apart from the gate lines 121 on a planar surface. A gap between the first sub-pixel electrode 191a and the gate lines 121 that are spaced apart may be about 2 μm to 7 μm. By spacing the first sub-pixel electrode 191a, to which a high data voltage is applied, apart from the gate lines 121, an unnecessary capacitance formed between the first sub-pixel electrode 191a and the gate lines 121 can be reduced, thereby reducing the kickback voltage.

A plurality of notches 7, which are recessed, are formed in the first portion 93a of the second sub-pixel electrode 191b. The plurality of notches 7 may be spaced apart at equal intervals. The notches 7 should control the movement of the liquid crystal molecules disposed on the first portion 93a of the second sub-pixel electrode 191b spaced apart from the fine branch portions of the second sub-pixel electrode 191b. By controlling the movement of the liquid crystal molecules disposed on the first portion 93a of the second sub-pixel electrode 191b, a singular point where the alignment direction of the liquid crystal molecules is changed is always at the same position. That is, a singular point is always formed on the notches 7, to prevent a portion where liquid crystal molecules are scattered from being changed. Therefore, the generation of irregular texture may be suppressed, thus preventing the generation of spots or afterimages. The notches 7 may have may have the shape of a triangle, a quadrangle, a trapezoid, or a semicircle.

The first and second sub-pixel electrodes 191a and 191b are physically and electrically connected to the first and second drain electrodes 175a and 175b via contact holes 185a and 185b, and are applied with a data voltage from the first and second drain electrodes 175a and 175b.

The planar pattern of these pixel electrodes 191 may be formed in various shapes. In the present exemplary embodiment, the pixel electrodes 191 include the first and second sub-pixel electrodes 191a and 191b, and the first and second sub-pixel electrodes 191a and 191b are connected to the first and second drain electrodes 175a and 175b. Alternatively, the pixel electrodes 191 may include one electrode and be connected to one drain electrode.

A lower alignment film 11 is formed on the pixel electrodes 191.

The common electrode display panel 200 will be described below.

A light blocking member 220 is formed on an insulating substrate 210 made of transparent glass or plastic. The light blocking member 220 is also called a black matrix and blocks light leakage.

The light blocking member 220 has a plurality of openings (not shown) that face the pixel electrodes 191 and have substantially the same shape as the pixel electrodes 191, and blocks light leakage between the pixel electrodes 191. However, the light blocking member 220 may consist of portions corresponding to the gate lines 121 and the data lines 171 and portions corresponding to the TFTs.

An overcoat 250 is formed on the light blocking member 220. The overcoat 250 is made of an organic insulator and provides a flat surface. The overcoat 250 may be omitted.

The common electrode 270 is formed on the overcoat 250. The common electrode 270 is made of a transparent conductor such as indium tin oxide (ITO) or indium zinc oxide (IZO).

An upper alignment film 21 is formed on the common electrode 270.

The lower alignment film 11 and the upper alignment film 21 may be vertical alignment films.

Polarizers (not shown) may be provided on outer surfaces of the lower thin film transistor display panel and the upper common electrode display panel.

The liquid crystal layer 3 is interposed between the lower thin film transistor display panel and the upper common electrode display panel, and the liquid crystal layer 3 includes liquid crystal molecules 31 having negative dielectric anisotropy. The liquid crystal molecules 31 of the liquid crystal layer 3 may have a pretilt angle so that their long axes are substantially parallel to the lengthwise direction of the fine branch portions of the first and second sub-pixel electrodes 191a and 191b, and they may be aligned so as to be substantially perpendicular to the surfaces of the two display panels 100 and 200. The liquid crystal layer 3 further includes an optical polymer, which enables the liquid crystal molecules 31 to have a pretilt angle so that their long axes are substantially parallel to the lengthwise direction of the fine branch portions of the first and second sub-pixel electrodes 191a and 191b. A light alignment method in which light such as ultraviolet rays may be obliquely irradiated to the alignment layers 11 and 21 may be used to control the alignment direction and the alignment angle of the liquid crystal molecules 31 as a means for forming a plurality of subregions where the liquid crystal molecules 31 are inclined in different directions.

When the gate lines 121 are supplied with a gate signal, the first and second sub-pixel electrodes 191a and 191b are supplied with data voltages via the data lines 171a and 171b. Then, the sub-pixel electrodes 191a and 191b supplied with the data voltages generate electric fields in cooperation with the common electrode 270 supplied with a common voltage. At this time, the sides of the fine branch portions distort the electric field to create a horizontal component that is perpendicular to the sides of the fine branch portions, and the tilt directions of the liquid crystal molecules 31 are determined by the horizontal component. Therefore, the liquid crystal molecules 31 initially tend to be tilted in a direction perpendicular to the sides of the fine branch portions. However, the directions of the horizontal component of the electric field distorted by the sides of the adjacent fine branch portions are opposite to each other and the gap between the fine branch portions is narrow, so that the liquid crystal molecules 31 tending to be tilted in opposite directions to each other are tilted together in a direction parallel to the lengthwise direction of the fine branch portions.

In an exemplary embodiment of the present invention, since the long axes of the fine branch portions of one pixel are distributed in four directions, the tilt directions of the liquid crystal molecules 31 are classified into four directions. When the tilt directions of the liquid crystal molecules 31 are diversified in this way, the reference viewing angle of the LCD may be increased.

As described above, a plurality of notches 7 are formed in the first portion 93a of the second sub-pixel electrode 191b of the LCD in accordance with an exemplary embodiment of the present invention. Therefore, the liquid crystal molecules 31 of the first portion 93a of the second sub-pixel electrode 191b, which are spaced apart from the fine branch portions of the first sub-pixel electrode 191a and second sub-pixel electrode 191b, may be arranged in a predetermined pattern by the notches 7. These notches 7 may have the shape of a triangle, a quadrangle, a trapezoid, or a semicircle, and the liquid crystal molecules 31 director arranged around the first portion 93a of the second sub-pixel electrode 191b is controlled to be directed toward the notches 7. Therefore, since the liquid crystal molecules 31 are stably arranged around the first portion 93a of the second sub-pixel electrode 191b spaced apart from the fine branch portions of the first sub-pixel electrode 191a and second sub-pixel electrode 191b, the texture generated at this portion may have the same shape. Consequently, this may prevent a change in picture quality caused by a change in texture, and a countermeasure such as blocking this portion by a light blocking film may be avoided.

The first sub-pixel electrode 191a and the second sub-pixel electrode 191b are supplied with respective data voltages through different data lines 171a and 171b, and the voltage of the first sub-pixel electrode 191a having a relatively small area is higher than the voltage of the second sub-pixel electrode 191b having a relatively large area.

When the voltages of the first sub-pixel electrode 191a and second sub-pixel electrode 191b are different from each other, the voltages applied to the liquid crystal capacitors Clca and Clcb formed in the two pixel electrodes 191a and 191b are different from each other. Thus, the tilt angles of the liquid crystal molecules 31 of each of the sub-pixels PXa and PXb are also different from each other. Therefore, the voltage applied to the liquid crystal capacitors Clca and Clcb can be adjusted so that an image viewed from a lateral side is similar to an image viewed from the front, thereby improving the lateral visibility of the LCD.

Next, the arrangement of liquid crystal molecules of a liLCD in accordance with an experimental example of the present invention will be described with reference to FIG. 4A, FIG. 4B, FIG. 4C, FIG. 5A, FIG. 5B, FIG. 5C, FIG. 6A, and FIG. 6B.

Figure 4A:
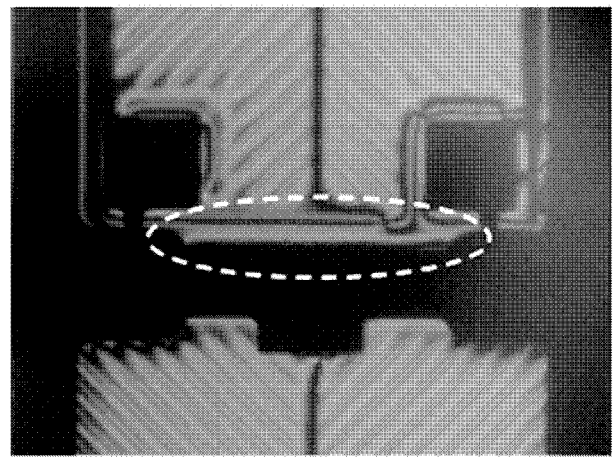
FIG. 4A, FIG. 4B, and FIG. 4C are microphotographs showing an irregular texture.
Figure 4B:
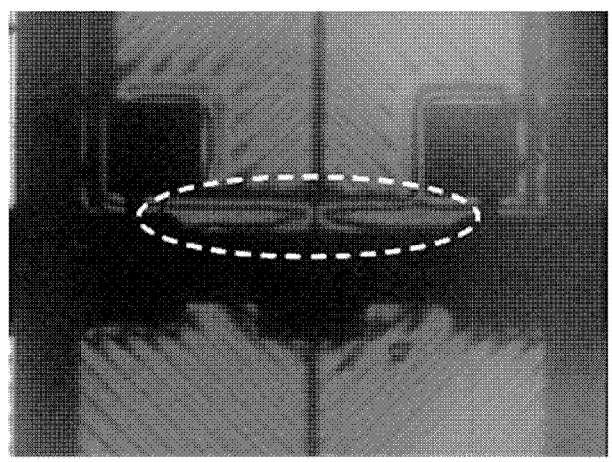
Figure 4C:
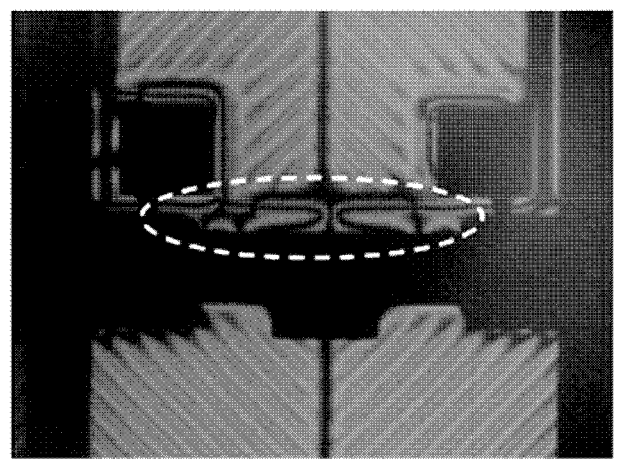
Figure 5A:
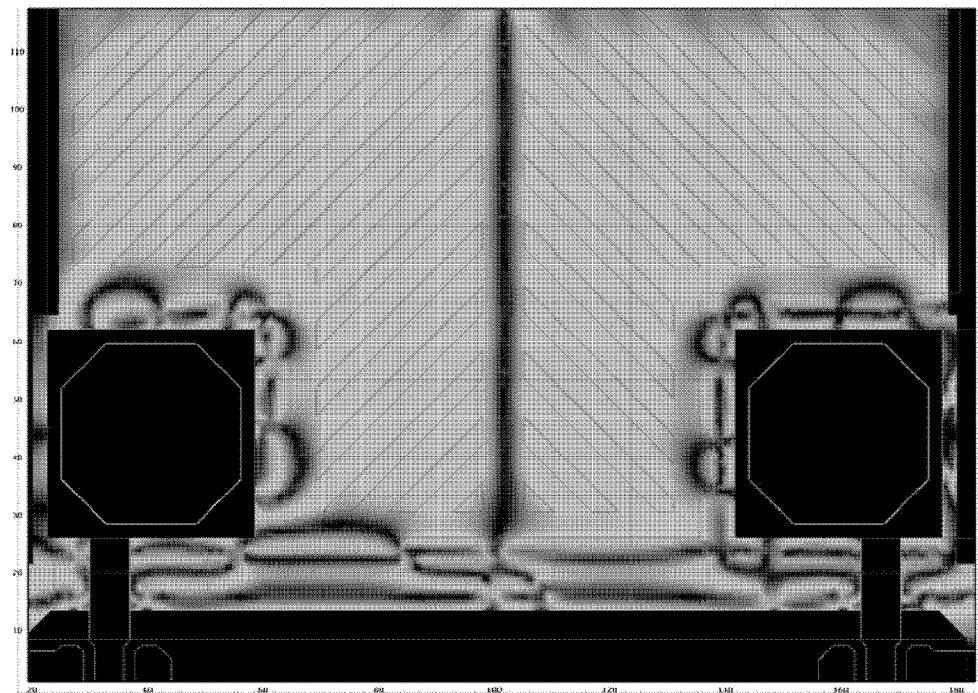
FIG. 5A, FIG. 5B, and FIG. 5C are microphotographs of a liquid crystal display.
Figure 5B:
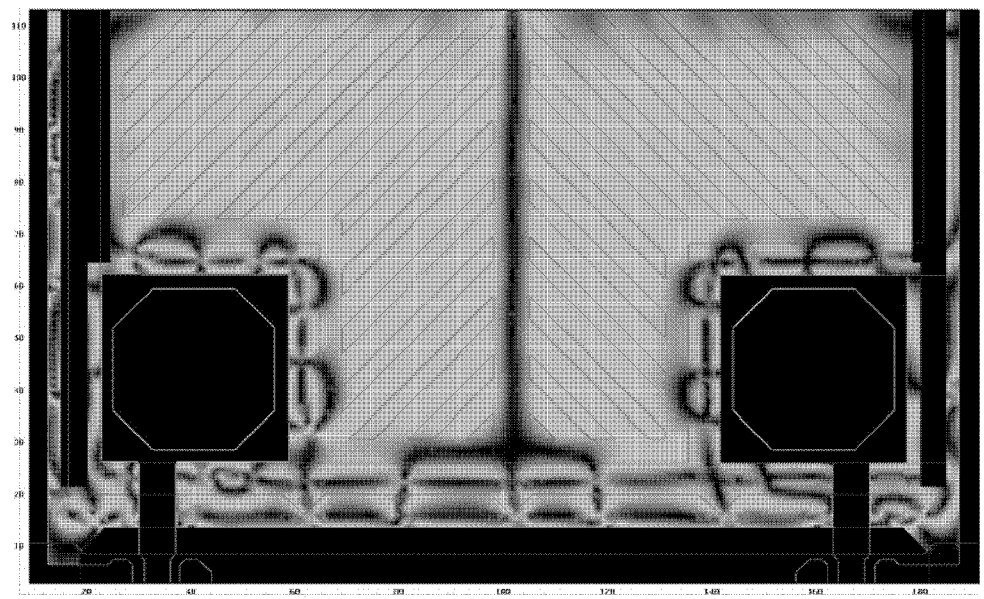
Figure 5C:
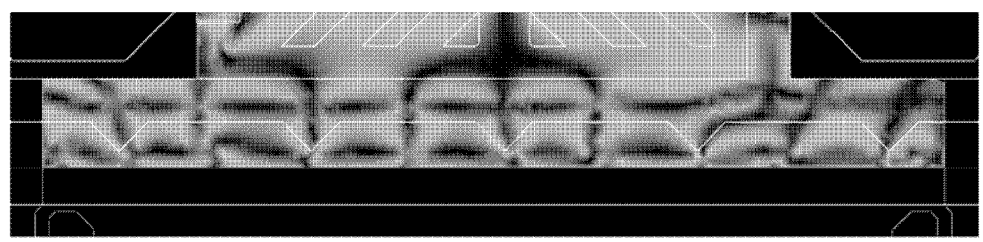
Figure 6A:
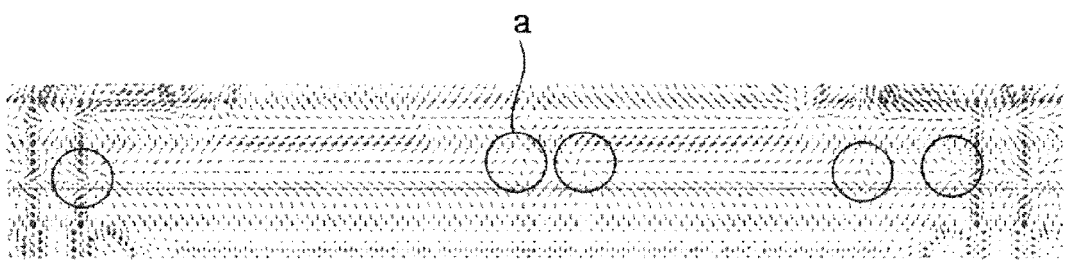
FIG. 6A and FIG. 6B are drawings showing simulation results of a liquid crystal molecules director in a liquid crystal display according to an exemplary embodiment of the present invention.
Figure 6B:
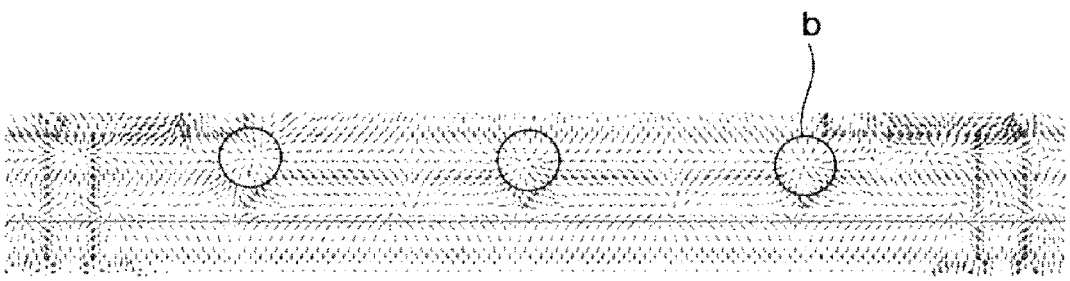

FIG. 4A, FIG. 4B, and FIG. 4C are microphotographs showing an irregular texture of an LCD, FIG. 5A, FIG. 5B, and FIG. 5C are microphotographs of an LCD, and FIG. 6A and FIG. 6B are drawings showing simulation results of the liquid crystal molecules director of an LCD.

In an exemplary embodiment of the present invention, the arrangement of liquid crystal molecules of the LCD is measured by applying a predetermined voltage to the first sub-pixel electrode 191a, the second sub-pixel electrode 191b, and the common electrode 270, without forming notches 7 in the LCD, and the arrangement of the liquid crystal molecules is also measured after forming three notches 7 and five notches 7 in the LCD under the same condition. The results of the measurement are shown in FIG. 4A, FIG. 4B, FIG. 4C, FIG. 5A, FIG. 5B, and FIG. 5C. Also, under the above condition, simulation of the liquid crystal molecules director is carried out, and the results thereof are shown in FIG. 6A and FIG. 6B.

First, referring to FIG. 4A, FIG. 4B, and FIG. 4C, an irregular texture is formed around the first portion 93a of the second sub-pixel electrode 191b. The portion where an irregular texture is formed is indicated by a dotted line. As shown in FIG. 4, unlike the LCD according to the exemplary embodiment of the present invention described above, if there are no notches 7 formed in the first portion 93a of the second sub-pixel electrode 191b, an irregular texture is generated around the first portion 93a of the second sub-pixel electrode 191b. The location or pattern of the irregular texture is varied even in the same LCD, and thus an irregular texture appears.

Next, referring to FIG. 5A shows a part of the LCD when there are no notches 7 formed in the first portion 93a of the second sub-pixel electrode 191b is shown. FIG. 5B and FIG. 5C show a part of the LCD when there are three notches 7 and five notches 7, respectively, formed in the first portion 93a of the second sub-pixel electrode.

Comparing FIG. 5A with FIG. 5B and FIG. 5C, if there are no notches 7 in the first portion 93a of the second sub-pixel electrode 191b, an irregular texture is generated around the first portion 93a of the second sub-pixel electrode 191b, and it can be seen that, if notches 7 are formed in the first portion 93a of the second sub-pixel electrode 191b, the liquid crystal molecules around the first portion 93a of the second sub-pixel electrode 191b are regularly arranged and thus a texture appears regularly formed. Further, it can be seen that the alignment of the liquid crystal molecules is varied according to the number of notches 7.

Next, simulation results of the liquid crystal molecules director will be described with reference to FIG. 6A and 6B. FIG. 6A depicts the movement of the liquid crystal molecules director when there are no notches 7 formed in the first portion 93a of the second sub-pixel electrode 191b, and FIG. 6B depicts the movement of the liquid crystal molecules director when there are three notches 7 formed in the first portion 93a of the second sub-pixel like in the LCD, according to an exemplary embodiment of the present invention.

In FIG. 6A and FIG. 6B, portions where the liquid crystal molecules director around the first portion 93a of the second sub-pixel electrode 191b is located are respectively circled by a solid line.

By evaluating the portion of FIG. 6A circled by the solid line "a", the movement direction of the liquid crystal molecules director is very irregular, and the position of the portion where the liquid crystal molecules director is moved is also irregular. However, by evaluating the portion of FIG. 6B circled by the solid line "b", the liquid crystal molecules director in the vicinity of the notches 7 formed in the first portion 93a of the second sub-pixel electrode 191b is moved toward the notches 7, and thus the liquid crystal molecules director is moved very regularly.

In this way, as in the LCD described in accordance with an exemplary embodiment of the present invention, pixels to which a high voltage is applied are spaced apart from the gate lines, thus reducing an unnecessary capacitance and reducing a kickback voltage. Further, the liquid crystal molecules are spaced apart from the fine branch portions of the pixel electrode and notches are formed in a part of the pixel electrode where no fine branch portions are formed, thereby controlling the movement of the liquid crystal molecules and reducing the generation of an irregular texture.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
    gate lines and data lines arranged on a first substrate;
    pixel electrodes connected to the gate lines and the data lines, each pixel electrode comprising a first sub-pixel electrode and a second sub-pixel electrode separated from each other by a gap;
    a common electrode arranged on a second substrate, and facing the pixel electrodes; and
    a liquid crystal layer disposed between the pixel electrodes and the common electrode, and comprising a plurality of liquid crystal molecules,
    wherein each of the first sub-pixel electrode and the second sub-pixel electrode comprises a plurality of fine branch portions,
    the second sub-pixel electrode comprises a connection portion surrounding the fine branch portions of the first sub-pixel electrode, and a plurality of notches are formed in the connection portion of the second sub-pixel electrode.

2. The liquid crystal display of claim 1, wherein
    each of the first sub-pixel electrode and the second sub-pixel electrode further comprises a plurality of sub-regions in which lengthwise directions of the fine branch portions are different from each other.

3. The liquid crystal display of claim 2, wherein
    the plurality of liquid crystal molecules are aligned with pretilt in the lengthwise direction of the fine branch portions.

4. The liquid crystal display of claim 2, further comprising:
    an alignment film arranged on the pixel electrodes or the common electrode,
    wherein the alignment film is light-aligned in the lengthwise direction of the fine branch portions.

5. The liquid crystal display of claim 2, wherein:
    each of the first sub-pixel electrode and the second sub-pixel electrode further comprises a horizontal stem portion and a vertical stem portion that form boundaries of the plurality of sub-regions; and
    the fine branch portions of the first sub-pixel electrode and the second sub-pixel electrode, respectively, extend toward the edges of the first sub-pixel electrode and the second sub-pixel electrode from the horizontal stem portion or the vertical stem portion.

6. The liquid crystal display of claim 1, wherein
    a part of boundaries of the fine branch portions of the first sub-pixel electrode is disposed on a first virtual straight line, and the gate lines are disposed on a second virtual straight line spaced apart from and parallel to the first virtual straight line.

7. The liquid crystal display of claim 6, wherein
    the first virtual straight line and the second virtual straight line are spaced apart from each other by 2 μm to 7 μm.

8. The liquid crystal display of claim 7, wherein
    the plurality of notches are disposed at equal intervals.

9. The liquid crystal display of claim 8, wherein
    the second sub-pixel electrode comprises three to five notches.

10. The liquid crystal display of claim 7, wherein
    the notches comprise the shape of a triangle, a quadrangle, a trapezoid, or a semicircle.

11. The liquid crystal display of claim 7, wherein
    a voltage of the first sub-pixel electrode is higher than a voltage of the second sub-pixel electrode.

12. The liquid crystal display of claim 1, wherein
    the plurality of notches are disposed at equal intervals.

13. The liquid crystal display of claim 12, wherein
    the second sub-pixel electrode comprises three to five notches.

14. The liquid crystal display of claim 1, wherein
    the notches comprise the shape of a triangle, a quadrangle, a trapezoid, or a semicircle.

15. The liquid crystal display of claim 1, wherein
    a voltage of the first sub-pixel electrode is higher than a voltage of the second sub-pixel electrode.

* * * * *